United States Patent Office 3,165,531
Patented Jan. 12, 1965

3,165,531
13-SUBSTITUTED-6-DEOXYTETRACYCLINES AND PROCESS UTILIZING THE SAME
Robert K. Blackwood, Gales Ferry, Hans H. Rennhard, Lyme, John J. Beereboom, Waterford, and Charles R. Stephens, Jr., Niantic, Conn., assignors to Chas. Pfizer & Co., Inc., New York, N.Y., a corporation of Delaware
No Drawing. Filed Mar. 8, 1962, Ser. No. 178,237
14 Claims. (Cl. 260—330.5)

The present invention relates to new and useful tetracyclines and to their utilization in the preparation of other valuable tetracyclines. More particularly, the invention relates to various mercaptotetracyclines, to the oxidation products and salts thereof, and to a novel process for the conversion of these antibiotics to the valuable 6-epi-6-deoxytetracyclines.

It has now been found that the addition of thiols to 6-deoxy-6-demethyl-6-methylene tetracyclines leads to the formation of valuable mercaptotetracyclines of the following structure:

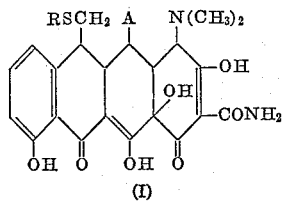

(I)

wherein A is selected from the group consisting of hydrogen and hydroxy and R is selected from the group consisting of primary and secondary alkyl of from one to twelve carbon atoms, R″CO where R″ is alkyl containing from one to three carbon atoms, phenyl, mono- and disubstituted phenyl, benzoyl, trifluoromethyl and

R′HC₂— wherein R′ is selected from the group consisting of mono- and disubstituted lower alkyl, carboxy, lower carbalkoxy, halo, phenyl, mono- and disubstituted phenyl, and furyl,
each substituent of said mono- and disubstituted lower alkyl being selected from the group consisting of hydroxy, lower alkoxy, carboxy, lower carbalkoxy, halo and amino, provided that where two of said substituents are joined to the same carbon atom at least one is selected from the group consisting of carboxy and lower carbalkoxy,
and each substituent of said mono- and disubstituted phenyl being selected from the group consisting of lower alkyl, hydroxy, lower alkoxy, carboxy, lower carbalkoxy, nitro and amino.

These new tetracyclines possess valuable antimicrobial activity against a variety of microorganisms, particularly against gram positive bacteria and antibiotic-resistant strains of Staphylococcus, and the appropriately designated as 6-deoxy-13-(substituted mercapto)tetracyclines, since the exocyclic carbon atoms at the 6-position of the tetracycline ring system is designated C–13.

As will be further discussed hereinafter, the new 6-deoxy-13-(substituted mercapto)tetracyclines may be converted to other valuable antibiotics, including the 6-deoxy-13-mercaptotetracyclines

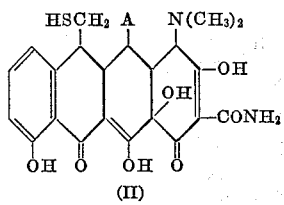

(II)

and the 6-deoxy-13-(substituted mercapto)tetracycline sulfoxides

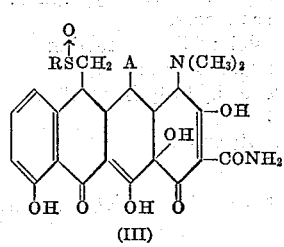

(III)

wherein A and R are as previously defined.

The 6-deoxy-13-(substituted mercapto)tetracycline sulfoxides are themselves valuable intermediates for various other novel tetracycline derivatives, including 7,13-epithio-6-deoxytetracycline

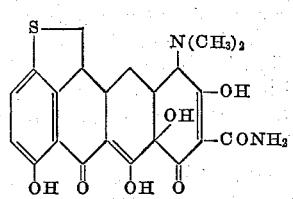

(IX)

and 11a,13-epithio-6-deoxytetracycline

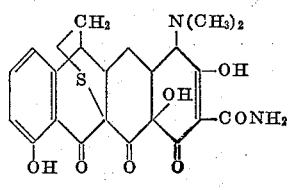

(X)

Each of the foregoing new classes of sulfur-containing tetracyclines have further values as intermediates in a newly discovered process for the preparation of 6-epi-6-deoxytetracyclines, antibiotics which are more fully described hereinafter. It has been discovered that treatment of the aforementioned sulfur-containing tetracyclines with Raney nickel provides an unexpectedly advantageous route to the 6-epi-6-deoxytetracyclines.

The principal reaction sequences of the present invention may be summarized as follows:

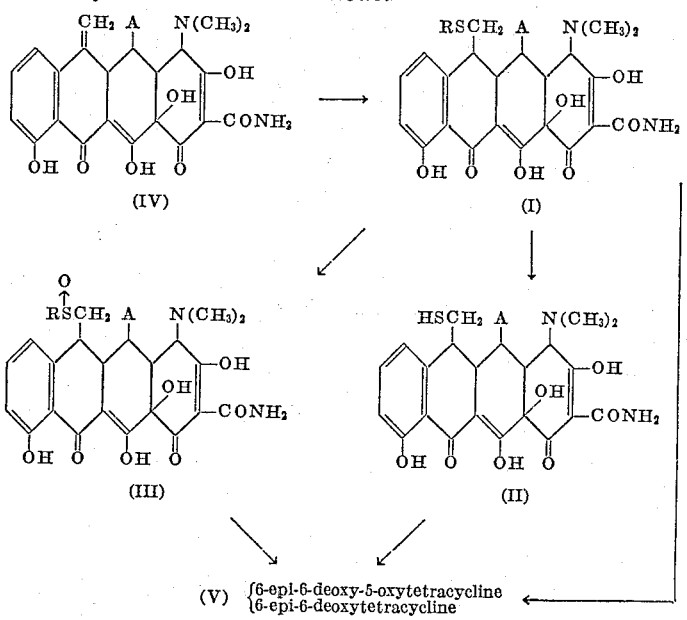

wherein A and R are as previously defined.

In the above sequences:

IV→I is a thiol addition reaction

I→III is an oxidation reaction;

I→II represents hydrolysis of those compounds of Structure I wherein R is acyl; and I→V
II→V  represent Raney nickel desulfurizations.
III→V The present application is a continuation-in-part of application Serial No. 136,699 filed September 5, 1961, which in turn a continuation-in-part of application Serial No. 31,236 filed May 23, 1960, each of the aforesaid parent applications now being abandoned. These earlier applications disclose the preparation of 6-deoxy-6-demethyl-6-methylenetetracyclines, designated 6-methylenetetracyclines for convenience, which are the starting compounds for the reaction sequences of the present invention. As described in the earlier applications, and more fully illustrated in the examples appearing hereinafter, 6-methylene tetracyclines are prepared by the following reaction sequence:

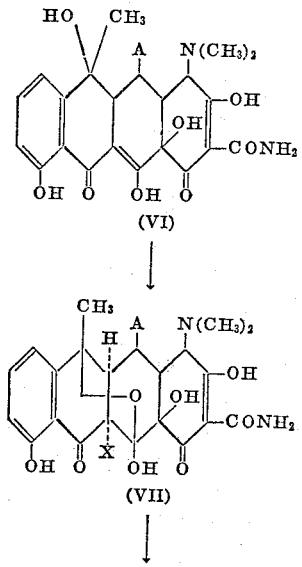

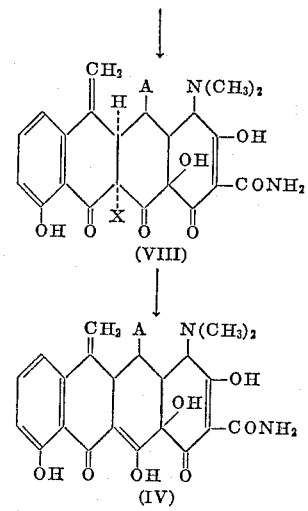

where A is hydrogen or hydroxy and X is halo, preferably chloro or fluoro.

Reaction VI→VII represents halogenation of a tetracycline compound such as tetracycline or 5-oxytetracycline with a halogenating agent in a reaction-inert solvent, to form an 11a-halotetracycline-6,12-hemiketal.

Reaction VII→VIII represents treatment of the hemiketal with a strong acid of the dehydrating type, such as liquid hydrogen fluoride, to form an 11a-halo-6-methylene tetracycline.

Reaction VIII→IV represents 11a-dehalogenation of compounds of Structure VIII, suitably by catalytic hydrogenolysis with palladium, rhodium or other noble metal catalyst; or by chemical reduction, e.g. by treatment with an alkali metal hydrosulfite or with an active metal-mineral acid combination, such as zinc and hydrochloric acid.

As further described in the earlier applications previously referred to, additional 6-methylene tetracyclines are prepared by aromatic substitution reactions as applied to the intermediates, i.e. to the 11a-halotetracycline-6,12-hemiketals, or to the 11a-halo-6-methylenetetracyclines. Thus are afforded 7 and/or 9-subsitituted-6-methylene-tetracyclines in which the substituents may be halogen, nitro, amino, or alkanoylamino. Reaction with a halogenating agent, i.e. a chlorinating, bromination or iodinating agent, affords the corresponding 7-halo teracycline as the principal product, which may also contain the corresponding 9-halo derivative. Nitration, i.e. with nitric acid in acetic acid or in liquid hydrogen fluoride, usually produces a mixture of the 7- and 9-nitro derivatives when both of these positions are previously unsubstituted, the principal product of this mixture being the 9-nitro compound. The thus-obtained mixtures may be separated by such procedures as column partition chromatography with toluene-pyridine-water or a similar solvent system. Aromatic nitro groups may be reduced to amino during 11a-dehalogenation, and amino groups may be converted to alkanoylamino, e.g. by acylation with the appropriate acid anhydride.

The 7- and/or 9-substituted 6-methylenetetracyclines which are afforded by the foregoing procedures may also be employed as starting compounds for the reactions of the present invention. However, the reaction of thiols with 7-halo-6-methylenetetracyclines, and particularly with 7-halo-6-methylene-5-oxytetracyclines, is sometimes difficult to effect. The 6-methylenetetracyclines of Structure IV are particularly preferred starting compounds for the new reaction sequences, because of their ready reaction with the thiols as well as the valuable properties of the products obtained therefrom.

A wide range of thiols are suitable for reaction with the 6-methylenetetracyclines to prepare the new compounds of Structure I. These include a variety of heterocyclic thiols such as α- and β-mercaptopyridines and their N-oxides. However, thiols of the formula RSH, wherein R is as previously defined, are particularly preferred in view of their availability, reactivity, and the valuable products which they provide. The wide choice of thiols available provides a valuable means of controlling the polarity of the antibiotic product to satisfy particular therapeutic requirements. At least a mole of thiol is to be employed for each mole of the 6-methylenetetracycline. There is, however, no disadvantage to the use of excess thiol and, indeed, such will usually be preferred, to insure complete conversion of the tetracycline to the desired product. In many cases such excess thiol will suitably fulfill the additional role of solvent medium.

An added reaction-inert solvent may optionally be included, i.e. one which does not react in an undesired fashion with the starting compounds or the desired product. The choice of solvent is not particularly critical. Such solvents as methanol, butanol, ethylene glycol, and water are among those which are found suitable. Of course, ordinarily a solvent will be selected which boils at or above the proposed reaction temperature, to avoid the inconvenience of reaction under pressure.

A wide range of reaction temperatures are suitable, temperatures ranging from about 0 to 130° C., and preferably 25–100° C., ordinarily being employed. Below 0° C. the reaction may be inconveniently slow, while temperatures appreciably above 130° C. entail the risk of reduced yield resulting from partial decomposition of starting compounds or products.

The use of a catalyst for the thiol addition reaction is a useful but by no means essential expedient for accelerating the reaction rate. Those agents which generate free radicals are appropriate catalysts, e.g. organic peroxides, hydrogen peroxide, oxygen, air, and light. A particularly useful catalyst is α,α'-azodi-isobutyronitrile (also commonly referred to as α,α'-azodibutyronitrile) which is free of the tendency, sometimes exihibited by peroxides, of producing thiol addition products containing traces of the corresponding sulfoxide. Suitable catalyst levels range from about 0.1 to about 10% or more based on the weight of the tetracycline.

A convenient procedure for determining when the reaction is complete involves the periodic removal of samples for analysis. Thus, for example, an aliquot may be diluted with methanol to a concentration of about 1 mg./ml. and subjected to paper chromatography. When the starting compound is found to have been consumed the reaction may be regarded as substantially complete. The time necessary will, of course, vary with the particular reactants, reactant proportions and conditions selected, i.e. temperature, catalyst (if any) and catalyst concentration. Thus, 6-methylene-5-oxytetracycline reactions are often slower than those involving 6-methylenetetracycline, and the same is true of secondary alkyl mercaptans in comparison with the primary. Reaction periods ranging from about 10 minutes to about 8 hours will usually be adequate, although several days may be found desirable at the lower temperatures.

At the conclusion of the reaction the product may be recovered by standard procedures. For example, it may be precipitated by addition of a nonsolvent, such as diethyl ether, water or acetone. The precipitated product may be further purified by recrystallization, suitably from alcohols such as methanol, ethanol, isopropanol and the like. The recrystallization may be conducted in the presence of salt-forming acids, such as paratoluenesulfonic acid, sulfosalicyclic acid, hydrochloric acid, naphthalenesulfonic acid, and the like, to obtain the recrystallized product in the form of the acid addition salt. Alternatively, purification may be effected by column chromatography with solvent systems such as ethyl acetate-water on cellulose powder.

The compounds of Structure I may be further converted to the valuable sulfoxides of Structure III by treatment with a molar proportion of hydrogen peroxide. This reaction is usually carried out in a reaction-inert solvent, e.g. methanol, at room temperature. Reaction periods of up to about 24 hours are usually adequate for effecting the conversion. However, it will be obvious that the optimum reaction period for a given reaction is readily determined by periodic analysis of aliquots by paper chromatography as previously described. Since, as previously noted, hydrogen peroxide is also a good catalyst for the thiol addition reaction, the sulfoxides may be prepared without isolation of the mercaptotetracycline. If this procedure is followed, it will usually be found desirable to introduce the peroxide in separate portions, rather than employing the entire mole as the start. The sulfoxides are effectively purified by crystallization, e.g. as acid addition salts, from solvent systems such as acetone-water.

Treatment of the compound of Structure I with two moles of hydrogen peroxide under more vigorous conditions is required for preparation of the corresponding sulfones.

The 6-deoxy-13-mercaptotetracyclines of Structure II may readily be obtained by hydrolysis of those products of Structure I wherein R is acyl, e.g. from 6-deoxy-13-acetylmercaptotetracycline. Treatment with concentrated hydrochoric acid at room temperature for up to 5 days is a suitable procedure. At the conclusion, the product may be recovered by pouring the reaction mixture into water, followed by solvent extraction, e.g. with butanol, and crystallization.

However, when the latter procedure is applied to those sulfoxides of Structure III wherein R is phenyl or substituted phenyl, the mercaptotetracyclines of Structure II are not formed. Instead, the S-epimer of the starting compound results. These products are also valuable antimicrobial agents.

When the foregoing procedure was applied to 6-deoxy-13-benzylmercaptotetracycline sulfoxide, it was at first believed that the active product was 6-deoxy-13-mercaptotetracycline. However, it has since been determined that this product is in fact a separable mixture of two new antibiotics, 7,13-epithio-6-deoxytetracycline (IX) and 11a,13-epithio-6-deoxytetracycline (X). Their preparation is effected by dissolving the benzylmercaptotetracycline sulfoxide in mineral acid, suitably 6–12 N hydrochloric acid, or 6–24 N sulfuric acid. Reaction temperatures between about 0 and 100° C., and preferably between 20 and 50°, are satisfactory, and room temperature will ordinarily be employed. The time necessary to effect the conversion will naturally vary with the particular temperature, acid and acid concentration, and it is advisable to determine the optimum reaction time for a particular set of conditions by paper chromatographic analysis of periodic samples of the reaction mixture. Reaction periods of from about 12 hours to 10 days are usually adequate. When the acid solution has stood for the desired period, the mixed product may be recovered by diluting the reaction mixture with water and ice, extracting with an organic solvent such as butanol, and evaporating the extract. The residue which results contains the 7,13- and 11a,13-epithio compounds. These may be separated, if desired, by fractional crystallization, e.g. from lower alkanols. Thus, 11a,13-epithio-6-deoxytetracycline hydrochloride is less soluble in methanol than the corresponding 7,13-epithio compound. It may therefore be crystallized first, and the 7,13-epithio compound subsequently crystallized from the mother liquor. Like the compounds of Structures I, II and III, the epithio compounds possess useful activity against a variety of microorganisms, as detailed in the appended examples. 7,13-epithio-6-deoxytetracycline may be converted to a bioactive sulfoxide by treatment with hydrogen peroxide under the conditions previously described for the conversion of compounds I to compounds III.

The sulfur-containing tetracyclines of Structures I, II, III, IX and X possess valuable antibacterial activity, as is evidenced by the data in Tables I and II, and in the appended examples, which summarize the in vitro activity of representative examples of the present new compounds against a variety of disease-causing microorganisms, including antibiotic-resistant strains. The minimum inhibitory concentration is determined by the well known serial dilution technique.

TABLE I.—IN VITRO ACTIVITY OF 6-DEOXYTETRACYCLINES IN BRAIN-HEART INFUSION

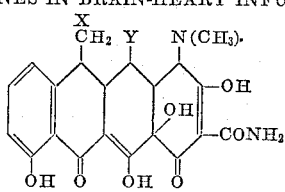

| Organism | Minimum Inhibitory Concentration (mcg./ml.) | | | | | | | |
|---|---|---|---|---|---|---|---|---|
| | A | B | C | D | E | F | G | H |
| M. pyogenes var. aureus | 3.12 | 0.78 | 3.12 | 0.78 | 1.56 | 50 | 12.5 | 3.12 |
| S. pyogenes | 0.09 | 0.78 | 50 | 0.19 | 0.39 | 6.3 | 0.19 | 0.19 |
| S. faecalis | | 6.3 | >100 | | 1.56 | | | 1.56 |
| D. pneumoniae | 0.78 | 1.56 | >100 | 0.39 | 1.56 | 1.56 | 0.78 | |
| E. rhysiopathiae | | | | 0.19 | 1.56 | 1.56 | 0.19 | 0.78 |
| C. diphtheriae | | 1.56 | 100 | | 0.78 | | | |
| L. monocytogenes | | 100 | >100 | | 1.56 | | | |
| B. subtilis | | 0.78 | >100 | | 0.78 | | | |
| E. coli | >100 | >100 | | >100 | | 12.5 | 50 | >100 |
| S. typhosa | >100 | 50 | 50 | | 100 | 12.5 | 50 | >100 |
| K. pneumoniae | >100 | 25 | 50 | | | | | >100 |
| N. gonorrhoeae | | 0.78 | 0.78 | | 0.78 | | | |
| H. influenzae | | 0.78 | 0.78 | | 1.56 | | | 3.12 |
| S. sonnei | | 25 | 12.5 | | 50 | | | |
| B. bronchiseptica | >100 | 3.12 | 25 | | 12.5 | | | |
| V. comma | | 100 | 50 | | 3 | | | |
| P. multocida | 0.78 | 0.78 | 0.78 | | 3 | | | |
| Mycobacterium 607 | | >100 | 1.56 | | | | | |
| S. agalactiae | | 0.78 | >100 | 1.56 | | | | |
| M. pyogenes var. aureus 376* | 1.56 | >100 | >100 | | 0.78 | >100 | | |
| M. pyogenes var. aureus 400* | 3.12 | >100 | >100 | 0.78 | 3.12 | >100 | 100 | >100 |
| M. pyogenes var. aureus K₂* | | | | | 3.12 | | | |
| M. pyogenes var. aureus K₃* | 0.78 | | | | 3.12 | | | |
| M. pyogenes var. aureus K₄* | 1.56 | | | | | | | |
| M. pyogenes var. aureus M₁* | 0.78 | | | | 6.25 | | | |
| M. pyogenes var. aureus M₂* | 1.56 | | | | | | | |
| M. pyogenes var. aureus M₁₂* | 0.78 | | | | | | | |
| Streptococcus 98 | | 0.78 | >100 | | 0.39 | | | 1.56 |
| Staph. 209P | | 0.78 | 1.56 | | 1.56 | | | |

*Antibiotic-resistant strains.

TABLE II.—IN VITRO ACTIVITY OF 6-DEOXYTETRACYCLINES IN BRAIN-HEART INFUSION PLUS HUMAN SERUM

| Organism | Minimum Inhibitory Concentration (mcg./ml.) | | | | | |
|---|---|---|---|---|---|---|
| | A | B | C | D | G | H |
| M. pyogenes var. aureus | 12.5 | 1.56 | 3.12 | 1.56 | 12.5 | 12.5 |
| Streptococcus pyogenes | 3.12 | 0.78 | 50 | | | 0.78 |
| Streptococcus 98 | | 0.78 | | | | |

In Tables I and II, the compounds are identified as follows:

Compound A: $X=CH_3CH_2CH_2CH_2S-$ and $Y=H$
Compound B: $X=HOCH_2CH_2S-$ and $Y=H$
Compound C: $X=HOCH_2CH_2S-$ and $Y=OH$
Compound D: $X=C_6H_5S-$ and $Y=H$
Compound E: $X=C_6H_5CH_2S-$ and $Y=H$
Compound F: $X=HOCH_2CH_2S(\rightarrow O)-$ and $Y=H$
Compound G: $X=C_6H_5S(\rightarrow O)-$ and $Y=H$
Compound H: $X=C_6H_5CH_2S(\rightarrow O)-$ and $Y=H$ These new products in some instances possess somewhat reduced in vivo activity relative to the 6-methylenetetracyclines from which they are prepared. However their outstanding in vitro activity against a wide range of microorganisms particularly suits them for topical application in the treatment of infections in animals, including man. They are likewise useful as antiseptics and disinfectants, and in veterinary practice and agriculture.

As previously mentioned, it has also been discovered that the new tetracyclines of Structures I, II, III, IX and X, including the salts thereof, are valuable intermediates for the preparation of the 6-epi-6-deoxytetracyclines, which are more fully described in copending application Serial No. 106,146, filed May 5, 1961. As disclosed in that application, the 6-epi-6-deoxytetracyclines are so designated since the steric configuration of the 6-methyl group is opposite to that of the known 6-deoxytetracyclines. Thus, the nomenclature "6-epi" is completely analogous to the accepted nomenclature of the known 4-epitetracyclines. As disclosed in the referenced application, these products, including 6-epi-6-deoxytetracycline and 6-epi-6-deoxy-5-oxytetracycline are useful by virtue of their high order of activity against a variety of microorganisms, both in vivo and in vitro. However, the therein-disclosed process for preparing these compounds provides a mixture of the 6-epi-6-deoxytetracycline and the previously known 6-deoxytetracycline, necessitating an extra separation step and entailing a reduced yield of the 6-epi compound. A new process has now been discovered for the preparation of 6-epi-6-deoxytetracyclines which does not co-produce the corresponding previously known 6-deoxytetracyclines. Recovery problems are therefore greatly simplified and yields improved to a valuable extent.

According to the new procedure, any of the sulfur-containing tetracyclines of Structures I, II, III, IX and X are contacted in a reaction-inert solvent with at least an equal weight of Raney nickel at a temperature of from 20 to 130° C. to effect the desired conversion.

The preparation of Raney nickel is given in Organic Syntheses, Collective Volume 3, pp. 176–183 (1955) and in many other publications. While the weight of Raney nickel selected will usually be at least equal to the weight of sulfur-containing tetracycline, even lower concentrations may successfully be employed. These, however, may entail the risk of incomplete reaction and are therefore not preferred. Much higher Raney nickel levels may, of course, be used, but usually there will be no added advantage to employing more than that equal to about ten times the weight of the tetracycline.

This new process is conducted in a reaction-inert solvent, the choice of which is not critical. It is particularly convenient to choose a solvent for the starting compound which has an atmospheric boiling-point at about the desired reaction temperature, and for this reason such solvents as methanol and ethanol will often be selected.

Reaction temperature is not critical, and reasonable reaction rates without serious decomposition risk are normally obtained at temperatures from about 20 to 130° C., and preferably at about 60–100° C. At these temperatures reaction periods of from about one to 48 hours ordinarily suffice to effect the desired conversion.

At the conclusion of the reaction, the Raney nickel is separated, suitably by centrifuging, and the product is recovered by evaporation of the reaction solution. In order to avoid the risk of some product loss by adsorption on the Raney nickel, it is a desirable precaution to thoroughly wash the catalyst with solvent, e.g. methanol, ethanol, acetic acid, or the like, and to combine these washings with the solution before evaporation. The product which is obtained, 6-epi-6-deoxytetracycline or 6-epi-6-deoxy-5-oxytetracycline (depending on the identity of substituent A in the starting compound), may be further purified if desired by standard procedures to separate any unreacted starting compound. Thus, for example, the product may be subjected to solvent distribution in such systems as butanol: 0.01 N aqueous HCl, or to crystallization from alcohols or other solvents as an acid addition salt or as the free base. The new process affords an excellent route to the 6-epi compounds in good yield and free of the 6-deoxytetracyclines of conventional structure.

Like other 6-deoxytetracyclines the thiol addition products of the present invention are suitable for aromatic substitution reactions, such as those previously discussed, e.g. halogenation to the corresponding 11α-halo- and 7 and/or 9, 11α-dihalo derivatives, which are further subject to 11α-dehalogenation by the procedures mentioned earlier and more fully described in aforementioned application Serial No. 31,236. Thus is provided still another route to the valuable D-ring-substituted analogs of the new products of the present invention.

The new products also lend themselves to a variety of other chemical transformations for the preparation of additional new and useful derivatives. For example chlorination of 6-deoxy-13-mercaptotetracycline or the corresponding 5-hydroxy compound provides a route to the corresponding 6-deoxy-13-(S-chloromercapto)tetracycline. Where A=hydroxy, treatment of this derivative with base provides in turn a novel pentacyclic derivative of the following structure:

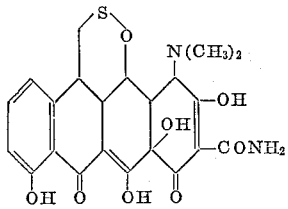

Where A=hydrogen, subjection of the S-chloromercapto compound to Friedel-Crafts reaction conditions provides a synthesis of still another novel pentacyclic derivative, the 7,13-epithio compound of Structure IX described earlier herein:

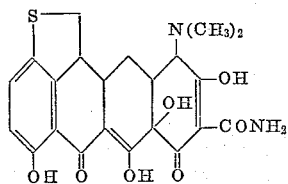

Furthermore, 6-deoxy-13-(S-chloromercapto)tetracycline is a valuable starting compound for new 6-deoxy-13-(alkoxymercapto)- and (aryloxymercapto)-tetracyclines.

The 13-phenylmercapto and 13-(substituted-phenylmercapto)sulfoxides of this invention are likewise appropriate starting compounds for 6-deoxy-6-demethyl-6-formyl-tetracycline and -oxytetracycline, e.g. by treatment with sulfuric acid at elevated temperature. These aldehydes may then be subjected to the numerous further transformations characteristic of the formyl group.

The new 13-acylmercapto sulfoxide derivatives may also be converted on treatment with acid to the aforementioned aldehydes, or hydrolyzed to the corresponding 13-sulfino derivatives.

An acyloxy substituent, e.g., R″COO wherein R″ is as hereinbefore defined, or benzoyloxy substituents may be introduced at C–13 in the thiol addition products of Structure I by treatment with the t-butyl ester of the appropriate per-acid, e.g. t-butyl peracetate or t-butyl perbenzoate, as described in the Journal of Organic Chemistry, volume 26, page 281 (1961). These reactions may, for example, be applied to the benzenethiol addition product to obtain a 6-deoxy-13-phenylmercapto, 13-acyloxy- or benzoyloxy-tetracycline, which may be hydrolyzed to the 6-deoxy-6-demethyl-6-formyltetracycline. Similarly, treatment of the α-toluenethiol addition product with t-butyl peracetate or perbenzoate provides a 6-deoxy-13-benzylmercapto, 13-acyloxy- or benzoyloxy-tetracycline, which may be hydrolyzed to the 6-deoxy-13-mercaptotetracycline.

The present new sulfur-containing compounds of Structures I, II, III, IX and X may be formulated into various compositions analogous to the parent tetracyclines from which they are derived. For topical application they may be formulated in the usual extending media, including petrolatum and the like, suitably at concentrations of about 0.1–10% by weight. They are also useful therapeutically in feeds or as growth stimulants, in veterinary practice and in agriculture.

The present invention embraces all salts, including acid-addition and metal salts, of the newly recognized amphoteric antibiotics. The well known procedures for preparing salts of tetracycline compounds are applicable here and are illustrated by examples appearing hereinafter. Such salts may be formed with both pharmaceutically acceptable and pharmaceutically unacceptable acids and metals. By "pharmaceutically acceptable" is meant those salt-forming acids and metals which do not substantially increase the toxicity of the amphoteric antimicrobial agent. The preferred salts are the acid addition salts and pharmaceutically acceptable metal salts.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g., p-toluenesulfonic acids, and the like. The pharmaceutically unacceptable acid addition salts, while not useful for therapy, are valuable for isolation, interconversion and purification of the newly recognized antibiotics, and for conversion to 6-epi-6-deoxytetracyclines by Raney nickel treatment. Further, they are useful for the preparation of pharmaceutically acceptable salts. Of this group, the more common salts include those formed with hydrofluoric and perchloric acids. Hydrofluoride salts are particularly useful for the preparation of the pharmaceutically acceptable salts, e.g. the hydrochloride, by solution in hydrochloric acid and crystallization of the hydrochloride salt formed. The perchloric acid salts are useful for purification and crystallization of the new antibiotics.

Whereas all metal salts may be prepared and are useful for various purposes, the pharmaceutically acceptable metal salts are particularly valuable because of their utility in therapy. The pharmaceutically acceptable metals include more commonly sodium, potassium and alkaline earth metals of atomic number up to and including 20 i.e. magnesium and calcium, and additionally, aluminum, zinc, iron and manganese, among others. Of course, the metal salts include complex salts, i.e. metal chelates, which are well recognized in the tetracycline art. The pharmaceutically unacceptable metal salts embrace most commonly salts of lithium and of alkaline earth metals of atomic number greater than 20, i.e. barium strontium, which are useful for isolation and purifying the antibiotics. Since the new antibiotics are amphoteric, they also form salts with amines of sufficient basicity.

It will be obvious that, in addition to their value in therapy, the pharmaceutically acceptable acid and metal salts are also useful in isolation and purification.

Many of the mercaptans employed in the present invention are commercially available, and the others may be readily prepared by standard procedures well known to those skilled in the art.

As previously noted, the optimum reaction times for the various reactions described herein may readily be determined by periodic withdrawal of aliquots for analysis by paper chromatography; employing standard techniques. Among the many well known chromatographic systems for such purpose, a particularly versatile one comprises 20:3 by volume toluene:pyridine saturated with pH 4.2 aqueous buffer as the mobile phase on chromatographic paper saturated with pH 4.2 aqueous buffer.

The following examples are given by way of illustration and are not to be construed as limitations of this invention, many variations of which are possible within the scope and spirit thereof.

EXAMPLE I

*6-Deoxy-13-(β-Hydroxyethylmercapto)Tetracycline*

Method A: 1 gram of 6-methylenetetracycline hydrochloride is heated in 10 ml. of 2-mercaptoethanol on the steam bath for two hours. The resulting solution is permitted to cool and treated with 90 ml. of diethyl ether with stirring. The product which precipitates is recovered and crystallized from 95% ethanol with the addition of sufficient triethylamine to neutralize the hydrochloric acid.

Method B: The procedure of Method A is repeated with the addition of 0.20 ml. of 30% hydrogen peroxide prior to heating, and the reaction time is reduced to 10 minutes. The product is recovered as before and purified by column chromatography in an ethyl acetate-water system on powdered cellulose to free it from contained sulfoxide.

Method C: The procedure of Method A is repeated with the addition of 100 mg. of $\alpha,\alpha'$-azodi-isobutyronitrile before heating, and the reaction time is reduced to 10 minutes. The product is recovered as in Method A.

Method D: The procedure of Method A is again repeated, but this time the reaction vessel is placed in close proximity to an ordinary 100 watt light bulb, and the reaction time is reduced to 10 minutes. The product is recovered as before.

When administered to mice in a single dosage via the subcutaneous route 30 minutes after infection with *Staphylococcus aureus*, the product exhibits a $PD_{50}$ (protective dose for 50% of the animals) of 2.77 mg./kg.

EXAMPLE II

*6-Deoxy-13-(Phenylmercapto)Tetracycline*

| | | |
|---|---|---|
| 6-methylenetetracycline hydrochloride | g | 5.0 |
| Benzenethiol | ml | 50 |
| Butanol | ml | 50 |
| Ethylene glycol | ml | 25 |

The listed components are stirred to dissolve the solid and heated on the steam bath for 70 minutes. The reaction mixture is then cooled to room temperature and treated with 250 ml. of ethylene glycol dimethyl ether with stirring. Two liters of ether are then added to the solution and the mixture is permitted to stand overnight.

The resulting precipitate is then filtered off and washed with ether to obtain 4.586 g. of crystalline product.

For further purification, 500 mg. is dissolved in 4.0 ml. methanol at room temperature, filtered and the filter is rinsed with methanol. The resulting 7 ml. of filtrate is treated with 400 mg. of paratoluenesulfonic acid, seeded and left to stand at room temperature. The product which crystallizes is recovered by filtration and vacuum dried at 85° C.

Elemental analysis.—Calculated for

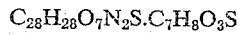

$$C_{28}H_{28}O_7N_2S \cdot C_7H_8O_3S$$

C, 59.5%; H, 5.14%; N, 3.96%; S, 9.06%. Found: C, 58.78; H, 5.17; N, 3.73; S, 9.40.

Ultraviolet absorption maxima occur at 257 m$\mu$ and 356 m$\mu$ (0.01 N methanolic HCl); 255 m$\mu$ and 386 m$\mu$ (0.01 N methanolic NaOH); and 248 and 369 m$\mu$ (0.01 N methanolic MgCl$_2$). The product is soluble in methanol to the extent of about 10 mg./ml.

EXAMPLE III

*6-Deoxy-13-(Benzylmercapto)Tetracycline*

This product is prepared by the procedure of Example II with the substitution of $\alpha$-toluenethiol (benzyl mercaptan) for benzenethiol. The product is crystallized from 95% ethanol as the paratoluenesulfonic acid salt.

The toluenesulfonate may be recrystallized by dissolving one gram in a mixture of 25 ml. acetone and 0.7 ml. concentrated sulfuric acid. On addition of 70 ml. water, the toluenesulfonate crystallizes.

Elemental analysis.—Calculated for

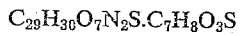

$$C_{29}H_{30}O_7N_2S \cdot C_7H_8O_3S$$

C, 59.7%; H, 5.3%; N, 3.9%; S, 8.9%. Found: C, 59.8%; H, 5.5%; N, 3.5%; S, 8.9%.

Infrared absorption maxima in potassium bromide are observed at 6.0, 6.25, 6.34, 6.63, 6.69, 6.89, 7.5, 7.7, 8.07, 8.2, 8.7, 8.9, 9.7 and 9.9$\mu$. Ultraviolet maxima occur at 267 m$\mu$ ($E^{1\%}_{1\,cm.}=255$) and 308 m$\mu$ (broad, $E^{1\%}_{1\,cm.}=190$) in 0.01 N methanolic HCl.

EXAMPLE IV

*6-Deoxy-13-(Butylmercapto)Tetracycline*

This product is prepared by the procedure of Example II with the substitution of n-butanethiol for benzenethiol.

EXAMPLE V

*6-Deoxy-13-(Carboxymethylmercapto)Tetracycline*

Method A: 100 mg. of 6-methylenetetracycline hydrochloride is combined with 1 ml. mercaptoacetic acid, and 0.03 ml. 30% aqueous hydrogen peroxide is added. The reaction mixture is heated for 15 minutes on the steam bath and cooled. The product is then precipitated by addition of 30 ml. diethyl ether with stirring.

Method B: 1 gram of 6-methylenetetracycline hydrochloride is combined with 10 ml. mercaptoacetic acid and 100 milligrams $\alpha,\alpha'$-azodi-isobutyronitrile. The reactants are heated for 2 hours on the steam bath and cooled. The product is then precipitated with acetone-ether and recovered by filtration.

EXAMPLE VI

*6-Deoxy-13-(Carbethoxymethylmercapto)Tetracycline*

| | | |
|---|---|---|
| 6-methylenetetracycline hydrochloride | g | 1 |
| Ethyl mercaptoacetate | ml | 10 |
| Ethylene glycol | ml | 5 |
| $\alpha,\alpha'$-Azodi-isobutyronitrile | mg | 100 |

The listed ingredients are combined and heated for 10 minutes on the steam bath. The reaction mixture is then cooled and the product precipitated with ether. It is further purified by crystallization from isopropyl alcohol as the paratoluenesulfonate.

EXAMPLE VII

*6-Deoxy-13-(Furanmethylmercapto)Tetracycline*

| | | |
|---|---|---|
| 6-methylenetetracycline hydrochloride | mg | 100 |
| 2-Furanmethanethiol | ml | 1 |
| Butanol | ml | 1 |
| Ethylene glycol | ml | 0.5 |

The reaction mixture is heated for 25 minutes on the steam bath, cooled, and the desired product is precipitated by the addition of diethyl ether.

EXAMPLE VIII

*6-Deoxy-13-(β-Carboxy, β-Aminoethylmercapto) Tetracycline*

Method A:

| | | |
|---|---|---|
| 6-methylenetetracycline hydrochloride | g | 1.0 |
| Cysteine base | g | 1.0 |
| Water | ml | 20 |

α,α'-Azodi-isobutyronitrile, 100 mg. in 0.5 ml. dimethyl formamide, is added to the listed reactants and the mixture is heated under nitrogen on the steam bath with stirring. At 1, 2 and 3 hours, additional 100 mg. portions of α,α'-azodi-isobutyronitrile in 0.5 ml. DMF are added. After 4 hours the mixture is cooled, additional water is added, and the desired product is recovered by filtration.

Method B:

| | | |
|---|---|---|
| 6-methylenetetracycline hydrochloride | g | 4.0 |
| Butanol | ml | 40.0 |
| Ethylene glycol | ml | 20.0 |
| Cysteine hydrochloride monohydrate | g | 7.0 |
| α,α'-Azodi-isobutyronitrile | mg | 400 |

The ingredients are combined in the above order and the mixture is then warmed, whereupon all solids dissolve to form a dark solution. The reaction mixture is heated at 100–105° C. under nitrogen for one hour and then cooled. It is poured into 600 ml. of rapidly stirring acetone, and a yellow solid separates. Another 300 ml. acetone is added to the slurry, which is then filtered. The filter cake is washed four times with fresh acetone and dried. Since it shows some tendency to cake, it is slurried in isopropanol, filtered, and then washed with fresh isopropanol and with acetone. It is then dried under vacuum.

Method C:

| | | |
|---|---|---|
| 6-methylenetetracycline hydrochloride | g | 4.0 |
| Butanol | ml | 40.0 |
| Ethylene glycol | ml | 20.0 |
| L-cysteine ethyl ester hydrochloride | g | 7.0 |
| α,α'-Azodi-isobutyronitrile | mg | 600 |

The ingredients are combined in the order listed above and stirred at 100–105° C. for 1.5 hours under nitrogen. The cooled reaction mixture is then poured into a mixture of 600 ml. isopropanol and 300 ml. ether. The yellow solid which precipitates is recovered by filtration and washed with ether. Since it is rather hygroscopic, the solid is dried carefully in the absence of air, to provide 1.9 g. of 6-deoxy-13-(β-carboethoxy, β-aminoethylmercapto) tetracycline. Upon addition of more ether to the filtrate, an additional 1.4 g. of equivalent purity is precipitated and recovered.

100 mg. of the ethyl ester obtained as described above is hydrolyzed by dissolving in 1.5 ml. conc. HCl and allowing to stand at room temperature for three days. The reaction mixture is then diluted with two volumes of water and the desired product is obtained by butanol extraction followed by evaporation of the butanol.

EXAMPLE IX

*6-Deoxy-13-(Acetylmercapto)Tetracycline*

6-methylenetetracycline hydrochloride, 10 g., is combined with 100 ml. thiolacetic acid and 1 g. α,α'-azodi-isobutyronitrile. The mixture is heated at 70° C. for 2 hours and cooled to room temperature. An additional gram of the butyronitrile is now added and the mixture is again heated at 70° C. for 2 hours and cooled. The product, 12.3 g., is precipitated by pouring the reaction mixture into 500 ml. stirring ether.

3.0 grams of the unrefined product, obtained as described above, is dissolved in 30 ml. methanol and the insolubles are filtered off. To the filtrate is added a solution of 6.0 grams paratoluenesulfonic acid in 10 ml. methanol. The purified product, 1.168 g., crystallizes as the paratoluenesulfonate and is recovered by filtration. It exhibits an infrared absorption maximum at 5.94μ and ultraviolet maxima at 267 and 355 mμ (0.01 N methanolic HCl) and at 248 and 385 mμ (0.01 N methanolic NaOH). It is soluble to the extent of about 10 mg./ml. in 3:1 by volume DMF:5% aqueous HCl. The product exhibits an in vitro activity equivalent to 620 oxytetracycline units per mg. vs. *K. pneumoniae*.

EXAMPLE X

*6-Deoxy-13-(β-Hydroxyethylmercapto)-5-Oxytetracycline*

| | | |
|---|---|---|
| 6-methylene-5-oxytetracycline hydrochloride | g | 20 |
| Mercaptoethanol | ml | 200 |
| 30% aqueous hydrogen peroxide | ml | 4 |

The combined reactants are heated for 1.5 hours on the steam bath, then cooled to room temperature. An additional 1.5 ml. 30% hydrogen peroxide is now added and the heating cycle is repeated. The product is then precipitated from the cooled reaction mixture by pouring into two liters of stirring ethanol. It is further purified by crystallization as the paratoluenesulfonate salt from water-ethanol.

Elemental analysis.—Calculated for

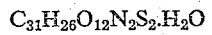

$$C_{31}H_{26}O_{12}N_2S_2 \cdot H_2O$$

C, 52.37%; H, 5.39%; O, 29.26%; N, 3.94%; S, 9.02%; H₂O, 2.53%. Found: C, 52.46; H, 5.19; O, 29.37; N, 3.82; S, 9.03; H₂O, 2.29.

In potassium bromide the product exhibits infrared absorption maxima at 5.96, 6.20, 6.32, and 6.89 μ. Ultraviolet absorption maxima occur at 220, 264, and 346 mμ (0.01 N methanolic HCl) and at 222, 348, and 373 mμ (0.01 N methanolic NaOH).

EXAMPLE XI

*6-Deoxy-13-(Phenylmercapto)-5-Oxytetracycline*

Method A:

| | | |
|---|---|---|
| 6 - methylene - 5 - oxytetracycline hydrochloride | mg | 100 |
| Benzenethiol | ml | 1 |
| Butanol | ml | 1 |
| Ethylene glycol | ml | 0.5 |
| 30% hydrogen peroxide | ml | 0.025 |

The listed reactants are heated on the steam bath for 1 hour and the butanol is then removed, together with the excess benzenethiol, by steam distillation. The product is recovered from the distillation residue by precipitation as the β-naphthalene sulfonic acid salt and dried under high vacuum.

Method B:

| | | |
|---|---|---|
| 6 - methylene - 5 - oxytetracycline hydrochloride | g | 1 |
| Benzenethiol | ml | 10 |
| Butanol | ml | 10 |
| Ethylene glycol | ml | 5 |

The reactants are treated with 100 mg. α,α'-azodi-isobutyronitrile and heated under nitrogen with stirring for 2 hours on the steam bath. The butanol and excess benzenethiol are then removed by steam distillation as before, and the stripped reaction mixture is filtered to separate a trace of dark impurity. The filtrate is adjusted to pH 4.5, whereupon the desired product precipitates in the form of the free base. It is further purified by crystallization from benzene-methylene chloride. The purified product exhibits a bioactivity of 135 oxytetracycline units per mg. vs. *K. pneumoniae*.

EXAMPLE XII

6-Deoxy-13-(Benzylmercapto)-5-Oxytetracycline

| | | |
|---|---|---|
| 6-methylene-5-oxytetracycline hydrochloride | g | 1.0 |
| α-Toluenethiol | ml | 10 |
| Butanol | ml | 10 |
| Ethylene glycol | ml | 10 |
| α,α'-Azodi-isobutyronitrile | mg | 100 |

The reactants are combined and heated under nitrogen on the steam bath for 2 hours. Butanol and excess toluenethiol are removed by steam distillation, and the residue is cooled and filtered. The product is isolated as the β-naphthalene sulfonic salt. Alternatively, it is isolated in the form of the free base by adjusting the pH to 5.0 and is purified by crystallization from benzene-methanol.

EXAMPLE XIII

6-Deoxy-13-(Carboxymethylmercapto)-5-Oxytetracycline

| | | |
|---|---|---|
| 6-methylene-5-oxytetracycline hydrochloride | g | 1 |
| Mercaptoacetic acid | ml | 10 |
| 30% hydrogen peroxide | ml | 0.025 |

The reactants are heated on the steam bath for 2.5 hours. The reaction mixture is then cooled, and the product is precipitated by the addition of ether and recovered by filtration.

EXAMPLE XIV

6-Deoxy-13-(Acetylmercapto)-5-Oxytetracycline

| | | |
|---|---|---|
| 6-methylene-5-oxytetracycline hydrochloride ethanolate | g | 25.0 |
| Thiolacetic acid | ml | 250 |
| Methanol | ml | 62.5 |
| Water | ml | 62.5 |
| α,α'-Azodi-isobutyronitrile | g | 2.5 |

The reactants are combined to form a clear solution and heated under nitrogen at reflux temperature for 2 hours. The mixture is then cooled and an additional 2.5 g. of the catalyst are added. The heating cycle is now repeated and the cooled solution is poured slowly into three liters of rapidly stirring ether. An orange gum forms from which the ether is separated by decantation. The gum is solidified by rubbing in fresh ether and separated by filtration. The orange yellow solid is ether-washed and dried in vacuum. 29.5 g. of product are obtained.

This is further purified by dissolving in a mixture of 88.5 ml. methanol and 88.5 ml. water. The resulting solution is treated with 29.5 g. sulfosalicylic acid followed by 177 ml. water. The resulting cloudy solution is seeded and stirred to crystallize. The crystalline product is filtered off, washed twice with methanol and dried in vacuum. 14.0 g. of purified product are thus obtained, exhibiting an infrared absorption maximum characteristic of the thioacetyl carbonyl at 5.94μ. Ultraviolet maxima are observed at 267, 316 and 348 mμ (0.01 N methanolic HCl) and at 238 and 373 mμ (0.01 N methanolic NaOH). An in vitro activity of 420–480 oxytetracycline units per mg. is observed vs. *K. pneumoniae*.

EXAMPLE XV

6-Deoxy-13-(s-Butylmercapto)Tetracycline

| | | |
|---|---|---|
| 6-methylenetetracycline hydrochloride | g | 1.0 |
| s-Butanethiol | ml | 10 |
| Butanol | ml | 10 |
| Ethylene glycol | ml | 5 |
| α,α'-Azodi-isobutyronitrile | mg | 100 |

The reactants are heated on the steam bath for a total of 8 hours, with cooling and addition of fresh catalyst portions at 2, 4 and 6 hours. Recovery is carried out as described in Example II.

EXAMPLE XVI

6-Deoxy-13-(β-Aminoethylmercapto)Tetracycline

This product is prepared by the procedure of Example VIII, Method C, first paragraph, substituting an equal quantity of β-aminoethyl mercaptan hydrochloride for the cysteine ester of that example.

EXAMPLE XVII

6-Deoxy-13-(Methylmercapto)Tetracycline

This product is prepared by the procedure of Example II with the substitution of an equal weight of methyl mercaptan for the benzenethiol, the reaction being conducted at 95° C. in a sealed bomb.

The corresponding 5-hydroxy compound is prepared as follows:

Methyl mercaptan, 50 ml., is condensed in a cooled flask, and to it is added 6-methylene-5-oxytetracycline, 5 g.; ethylene glycol, 50 ml.; and α,α'-azodi-isobutyronitrile, 2.5 g. Finally, 100 ml. of 1,2-dimethoxyethane and 28 ml. of water are added. The mixture is pressure-sealed, stirred to effect solution, and permitted to stand for seven days at room temperature. The reaction mixture is then concentrated at reduced pressure, diluted with water, acidified to pH 1 with hydrochloric acid, and extracted with butanol. The combined butanol extracts are concentrated in vacuum, and the resulting residue is slurried with ether. The desired product, as the hydrochloride salt, is filtered from the ether, washed with additional ether and dried.

EXAMPLE XVIII

Following the procedures of the preceding examples, the following products are prepared from the appropriate mercaptans and 6-methylenetetracyclines:

6-deoxy-13-(isoctylmercapto)-5-oxytetracycline
6-deoxy-13-(n-dodecylmercapto)-5-oxytetracycline
6-deoxy-13-(trifluoromethylmercapto-5-oxytetracycline
6-deoxy-13-(trifluoromethylmercapto)tetracycline
6-deoxy-13-(2,6-dimethylphenylmercapto)-5-oxytetracycline
6-deoxy-13-(4-hydroxyphenylmercapto)tetracycline
6-deoxy-13-(3-ethoxyphenylmercapto)-5-oxytetracycline
6-deoxy-13-(3-carboxyphenylmercapto)tetracycline
6-deoxy-13-(4-carbomethoxyphenylmercapto)-5-oxytetracycline
6-deoxy-13-(2-nitrophenylmercapto)tetracycline
6-deoxy-13-(4-aminophenylmercapto)tetracycline
6-deoxy-13-(propionylmercapto)tetracycline
6-deoxy-13-(benzoylmercapto)tetracycline
6-deoxy-13-(carbobutoxymethylmercapto)-5-oxytetracycline
6-deoxy-13-(bromomethylmercapto)tetracycline
6-deoxy-13-(4-methylbenzylmercapto)-5-oxytetracycline
6-deoxy-13-(2-hydroxybenzylmercapto)tetracycline
6-deoxy-13-(2,6-dimethoxybenzylmercapto)-5-oxytetracycline
6-deoxy-13-(2-carboxybenzylmercapto)tetracycline
6-deoxy-13-(3-carboethoxybenzylmercapto)tetracycline
6-deoxy-13-(3-nitrobenzylmercapto)tetracycline
6-deoxy-13-(4-aminobenzylmercapto)tetracycline
6-deoxy-13-(4-methoxybutylmercapto)-5-oxytetracycline
6-deoxy-13-(β-butoxyethylmercapto)-5-oxytetracycline
6-deoxy-13-(β-carboxyethylmercapto)tetracycline
6-deoxy-13-(β-carbomethoxyethylmercapto)tetracycline
6-deoxy-13-(2,3-dichloropropylmercapto)-5-oxytetracycline
6-deoxy-13-(β-iodoethylmercapto)tetracycline
6-deoxy-13-(β-aminoethylmercapto)tetracycline
6-deoxy-13-(butyrylmercapto)-5-oxytetracycline

EXAMPLE XIX

6-Deoxy-13-Mercapto-5-Oxytetracycline 6-deoxy-13-(acetylmercapto) - 5 - oxytetracycline sulfosalicylate salt, 8.0 g., prepared as described in Example XIV is dissolved in 400 ml. conc. hydrochloric acid by vigorous agitation at room temperature. The reaction mixture is allowed to stand for five days, turning from yellow green to orange in color. It is then poured slowly with stirring into a 1500 ml. container filled with ice plus 500 ml. of water. When the resulting cloudy yellow solution has warmed to room temperature it is extracted once with 500 ml. butanol. Another 500 ml. water is then added to the aqueous phase and the latter is extracted three more times with 250 ml. portions of fresh butanol. All butanol extracts are combined and evaporated in high vacuum on a warm water bath to a yellow solid. This residue is washed thoroughly with ether and dried. It is further purified by dissolving 6.0 g. in 600 ml. methanol at room temperature, treating with 2.0 g. Darco G–60 activated carbon at reflux temperature, and filtering. The cake is washed with methanol, and the combined filtrate and washings are heated on the steam bath, with the addition of 6.0 g. sulfosalicylic acid. The resulting solution is concentrated to about 40 ml. and stirred overnight at room temperature. The crystalline solid which separates is recovered by filtration, ether-washed and dried, to obtain 3.5 g. of the desired product.

Elemental analysis.—Calculated for $C_{22}H_{24}O_8N_2S.C_7H_6O_6S.2H_2O$:

C, 47.6%; H, 4.7%; N, 3.8%; S, 8.8%. Found: C, 47.3; H, 5.0; N, 3.7; S, 8.7.

Ultraviolet absorption maxima almost identical with the starting compound are observed, i.e., at 267, 315, and 350 mμ (0.01 N methanolic HCl) and at 238 and 365 mμ (0.01 N methanolic NaOH). While the infrared spectrum exhibits a weak band at 5.98μ, it no longer has the very strong band at 5.94μ observed with the starting compound. The product exhibits in vitro bioactivity in the standard *B. subtilis* plate assay.

The corresponding 5-deoxy product is prepared from the 6-deoxy-13-(acetylmercapto)tetracycline of Example IX by following the above procedure.

EXAMPLE XX

*6-Deoxy-13-(Phenylmercapto)Tetracycline S-Oxide*

6-deoxy-13-(phenylthio)tetracycline, 100 mg., prepared as in Example II, is combined with 1 ml. methanol and treated with one equivalent of 30% aqueous hydrogen peroxide. The reaction mixture is permitted to stand overnight at room temperature and is then evaporated to dryness. The product is crystallized as the paratoluenesulfonate salt from acetone-water.

Elemental analysis.—Calculated for $C_{28}H_{28}O_8N_2S.C_7H_8O_3S$:

C, 58.1% H, 5.0%; N, 3.9%; S, 8.8%. Found: C, 58.5; H, 4.9; N, 3.7; S, 9.0. Ultraviolet absorption maxima are observed at 257 and 355 mμ (0.01 N methanolic HCl); 250 and 384 mμ (0.01 N methanolic NaOH); and 241, 271 and 368 mμ (0.01 N methanolic MgCl$_2$. In vitro activity vs. *K. pneumoniae*=350μ/mg.

EXAMPLE XXI

*6-Deoxy-13-(β-Hydroxyethylmercapto)Tetracycline S-Oxide*

This product is prepared by following the procedure of Example XX with the substitution of the 6-deoxy-13-(β-hydroxyethylthio)tetracycline of Example I as the starting compound. The product is soluble in 1:1 by volume acetone: 5% aqueous HCl.

EXAMPLE XXII

*6-Deoxy-13-(Benzylmercapto)Tetracycline S-Oxide*

The product of Example III as the toluenesulfonate salt, 5 g., is dissolved in 500 ml. methanol at room temperature, and 1.5 ml. 30% aqueous hydrogen peroxide is added. After standing overnight, the reaction mixture is stripped to dryness, the residue is stirred with ether and the product is filtered off. It is purified by crystallization from acetone-ethanol, to obtain the desired sulfoxide as the toluenesulfonate having the following analysis:

Calcd. for $C_{29}H_{30}O_8N_2S.C_7H_8O_3S$: C, 58.6%; H, 5.2%; N, 3.8%; S, 8.7%. Found: C, 58.8; H, 5.1; N, 3.5; S, 8.4.

Infrared absorption maxima in potassium bromide are observed at 6.02, 6.27, 6.37, 6.64, 6.71, 6.92, 7.53, 7.73, 8.09, 8.26, 8.6, 8.75 and 8.94μ. Ultraviolet maxima occur at 267 mμ ($E_{1\,cm.}^{1\%}$=260) and 354 mμ ($E_{1\,cm.}^{1\%}$=202)

in 0.01 N methanolic HCl. When the product is administered to mice in single dosage via the subcutaneous route 30 minutes after infection with *S. aureus*, a 45% survival rate is observed at a dosage level of 12.5 mg./kg.

Following the procdure of Example XX, the products of Examples IV through XVIII are also converted to their corresponding sulfoxides. Optimum reaction time is determined in each case by standard paper chromatographic analysis of samples periodically withdrawn from the reaction mixture. The sulfoxides are generally found to be more polar than the starting compounds. When the spot corresponding to the starting compound has substantially disappeared, the reaction is halted and the product is recovered.

EXAMPLE XXIII

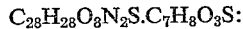

*7,13-Epithio-6-Deoxytetracyline and 11a,13-Epithio-6-Deoxytetracycline*

6-deoxy-13-(benzylmercapto)tetracycline S-oxide, 500 mg., is dissolved in 10 ml. concentrated hydrochloric acid and allowed to stand at room temperature for five days. At this time, any insolubles present are removed by filtration, and the filtrate is diluted with 10 ml. of ice-water. The solution is extracted with butanol, and the butanol extract is decolorized with Darco G–60 activated carbon, filtered and evaporated to dryness to obtain the desired mixture. The reaction is repeated on a larger scale, as follows:

6-deoxy-13-(benzylmercapto)tetracycline S-oxide, 5 g., is dissolved in 150 ml. concentrated hydrochloric acid. The reaction mixture is permitted to stand for 8 days at room temperature. It is then diluted with 500 ml. of ice and water, and the mixture is extracted with butanol. The combined butanol extracts are evaporated to dryness under vacuum, the resulting residue is slurried with ether, and the crystalline mixture of epithio compounds (3 g.) is recovered by filtration.

*11a,13-epithio-6-deoxytetracycline.*—One gram of the crystalline mixture is dissolved in 20 ml. methanol, and 0.5 ml. concentrated hydrochloric acid is added. The white, crystalline 11a,13-epithio compound, 265 mg., crystallizes from the solution and is recovered by filtration. The mother liquor is reserved.

Elemental analysis.—Calculated for $C_{22}H_{22}O_7N_2S.HCl$: C, 53.5%; H, 4.7%; N, 5.7%; S, 6.5%; Cl, 7.1%. Found: C, 53.1% H, 4.5; N, 5.2; S, 6.6; Cl, 6.9.

Infrared absorption maxima are observed in potassium bromide at 5.75, 6.87 and 8.07μ. Ultraviolet maxima occur at 262 mμ ($E_{1\,cm.}^{1\%}$=406) and 345 mμ (broad, $E_{1\,cm.}^{1\%}$=101) in 0.01 N methanolic HCl; at 258 mμ ($E_{1\,cm.}^{1\%}$=292), 283 mμ ($E_{1\,cm.}^{1\%}$=236), and 340 mμ ($E_{1\,cm.}^{1\%}$=111) in 0.01 N methanolic MgCl$_2$; and at 235 mμ ($E_{1\,cm.}^{1\%}$=378) and 383 mμ ($E_{1\,cm.}^{1\%}$=98)

in 0.01 N methanolic NaOH. The product exhibits in vitro bio-activity of 50 μ/mg. vs. *K. pneumoniae* (oxytetracycline standard).

*7,13-epithio-6-deoxytetracycline.*—The mother liquor from the above-described methanolic HCl crystallization is evaporated to about 10 ml., and a crop of the mixed epithio compounds is separated by filtration. Further evaporation of the filtrate leads to crystallization of 100 mg. of the 7,13-epithio compound, having an elemental analysis as follows:

Calcd. for: $C_{22}H_{22}N_2O_7S \cdot HCl \cdot H_2O$: C, 51.5%; H, 4.9%; N, 5.5%; S, 6.5%; Cl, 6.9. Found: C, 53.4; H, 4.9; N, 5.2; S, 6.2; Cl, 7.1.

Infrared absorption maxima in potassium bromide are observed at 6.05, 6.35, 6.84, 7.44, 7.64, 7.95, 8.24 and 8.87μ. Ultraviolet maxima occur at 252 mμ ($E_{1cm}^{1\%}=473$), 336 mμ ($E_{1cm}^{1\%}=236$), and 420 mμ ($E_{1cm}^{1\%}=85$) in 0.01 N methanolic HCl; at 247 mμ ($E_{1cm}^{1\%}=498$), 262 mμ ($E_{1cm}^{1\%}=344$), and 360 mμ ($E_{1cm}^{1\%}=244$) in 0.01 N methanolic $MgCl_2$; and at 248 mμ ($E_{1cm}^{1\%}=502$) and 391 mμ ($E_{1cm}^{1\%}=299$)

in 0.01 N methanolic NaOH. In vitro activity vs. *K. pneumoniae*=1290μ/g. (oxytetracycline standard).

The in vitro activity of the 7,13-epithio compound is further evaluated against a variety of microorganisms in brain-heart infusion. Minimum inhibitory concentrations (MIC) are found to be as follows:

| Organism: | MIC (mcg./ml.) |
|---|---|
| *M. pyogenes* var. *aureus* | 0.39 |
| *S. pyogenes* | 0.39 |
| *S. faecalis* | 0.28 |
| *D. pneumoniae* | 0.39 |
| *E. rhusiopathiae* | 0.19 |
| *A. aerogenes* | 12.5 |
| *E. coli* | 6.3 |
| *P. vulgaris* | >100 |
| *P. aeruginosa* | >100 |
| *S. typhosa* | 6.3 |
| *K. pneumoniae* | 3.12 |
| *H. influenzae* | 6.3 |
| *M. pyogenes* var. *aureus* 376 * | 1.56 |
| *M. pyogenes* var. *aureus* 400 * | 3.12 |
| Staph. E/R–1 * | 3.12 |
| Staph. E/R–2 * | 3.12 |
| Staph. E/R–3 * | 3.12 |
| Streptococcus 98 | 0.19 |

* Antibiotic-resistant strains.

In vitro activity in brain-heart infusion plus human serum is also determined with the 7,13-epithio compound, and minimum inhibitory concentrations of 6.25 and 3.12 mcg./ml. are observed, respectively, with *M. pyogenes* var. *aureus* and *S. pyogenes* in this medium.

7,13-epithio-6-deoxytetracycline, 10 mg., is dissolved in a mixture of 1 ml. methanol, 0.3 ml. acetone and 0.2 ml. 1,2-dimethoxymethane, and 0.04 ml. of 30% aqueous hydrogen peroxide is added. The reaction mixture is permitted to stand overnight at room temperature. This solution, diluted to 10 ml., exhibits in vitro activity vs. *K. pneumoniae* of 2460μ/ml. (oxytetracycline standard), attributed to the sulfoxide of the starting compound.

EXAMPLE XXIV

The procedure of the preceding example, first paragraph, is applied to 6-deoxy-13-(phenylmercapto)tetracycline S-oxide, and 381 mg. of product are obtained exhibiting an in vitro activity of 820 oxytetracycline units vs. *K. pneumoniae* and ultraviolet absorption maxima at 268 and 357 mμ. The evidence indicates that the product is the S-epimer of the starting compound. The infrared spectrum exhibits absorption maxima at 6.02, 6.22, 6.33, and 6.90μ, but has no carbonyl absorption band between 5 and μ. The Rf value is found to be 0.95 in a system consisting of Whatman No. 1 chromatographic paper saturated with pH 3.5 aqueous buffer as the stationary phase and 20:10:3 by volume nitromethane:chloroform:pyridine as the mobile phase. An additional spot, apparently the 4-epimer, is observed at a point corresponding to an Rf value of 0.75. A similar reaction is observed when 6-deoxy-13-(phenylmercapto)-5-oxytetracycline S-oxide is subjected to these reaction conditions.

EXAMPLE XXV

6-Epi-6-Deoxy-5-Oxytetracycline

To 8 g. of Raney nickel (W–4) is added a solution of 1 g. of 6-deoxy-13-(benzylmercapto)-5-oxytetracycline (Example XII) in 30 ml. methanol together with sufficient hydrochloric acid to provide a pH of 1.5. The suspension is stirred at reflux temperature for 6 hours, and the supernatant liquid is then separated by centrifuging. The solid catalyst is washed with two 30 ml. portions of methanol and all three methanol solutions are then combined and evaporated to dryness under reduced pressure. The resulting residue consists of 890 mg. of the desired product. It is crystallized by dissolving in 20 ml. methanol containing 1 g. of 5-sulfosalicyclic acid, treating with activated charcoal, filtering and allowing the filtrate to stand at room temperature. The 500 mg. of sulfosalicylate salt which separates is filtered off and dried. The identity of this product is confirmed by paper chromatography in comparison with an authentic sample. It is found to be free of the compound of the opposite steric configuration.

EXAMPLE XXVI

6-Epi-6-Deoxytetracycline 1 gram of 6-deoxy-13-(phenylmercapto)tetracycline (Example II) is dissolved in 100 ml. absolute ethanol with heat and vigorous stirring. The solution is cooled, treated with 3 g. Raney nickel, and heated at reflux temperature for 3 hours. It is allowed to stand at room temperature for 3 days and then filtered. The Raney nickel is thoroughly washed with ethanol and the combined ethanol filtrates are evaporated to dryness in vacuo. The resulting greenish-yellow solid is distributed between butanol and 0.01 N aqueous HCl, and the pH is adjusted to 1.5. After vigorous agitation the layers are separated and the butanol layer is washed once with 0.01 N HCl (pH 1.5). Both acid layers are now washed once with fresh butanol and all butanol fractions are combined and evaporated under reduced pressure to a yellow solid.

The experiment is repeated, reducing the Raney nickel level to one gram and the reaction time to one hour at reflux temperature, with substantially the same results.

EXAMPLE XXVII

Following the procedures of Examples XXV and XXVI the products of Examples I, III–XI, and XIII–XXIII are converted to the corresponding 6-epi-6-deoxytetracyclines. Reaction temperatures ranging from 40 to 130° C. are successfully employed by appropriate selection of solvents including methanol, ethanol, propanol and butanol, or by reaction in a sealed vessel where the reaction temperature exceeds the atmospheric boiling point of the selected solvent. Completeness of reaction is judged by disappearance of the starting compound, as determined by paper chromatography employing 20:10:3 nitromethane:chloroform:pyridine as the mobile phase on Whatman No. 1 chromatographic paper saturated with pH 3.5 aqueous buffer. Recovery and purification are carried out as in Examples XXV and XXVI.

EXAMPLE XXVIII

11a-Chloro-5-Oxytetracycline-6,12-Hemiketal

Twenty-three grams of anhydrous oxytetracycline is dissolved in 250 ml. of 1,2-dimethoxyethane and 8 g. of N-chlorosuccinimide is next added. The mixture is stirred for two minutes and then poured into 1 liter of stirred water. The product which separates is collected by filtration, water-washed and dried. Infrared analysis of the product (KBr at 1% concentration) shows no carbonyl absorption in the 5–6 micron region but shows the following principal peaks: 6.12, 6.35, 6.66, 6.85, 7.22, 7.55, 7.75, 7.92, 8.14, 8.36, 8.78, 9.18, 9.43 microns. Bioassay of the product shows a tetracycline activity of 4 mcg./mg.

EXAMPLE XXIX

*11a-Chloro-6-Deoxy-6-Demethyl-6-Methylene-5-Oxytetracycline*

Five grams of 11a-chloro-5-oxytetracycline-6,12-hemiketal is added to 15 ml. of dry, liquid hydrogen fluoride, and the mixture is stirred for 3.5 hours at ice-bath temperature. The hydrogen fluoride is evaporated off by warming under a flow of nitrogen gas to obtain the product as the hydrofluoride salt.

The crude hydrofluoride product is dissolved in water and conc. HCl or perchloric acid (70%) is added dropwise to precipitate the hydrochloride or perchlorate salts respectively. The hydriodide salt is precipitated from acetone solution of the crude hydrofluoride salt by addition of 47% hydriodic acid.

Alternatively, the original reaction mixture is diluted with 6–7 volumes of water and ice and perchloric acid or naphthalene sulfonic acid (concentrated acid) is added to precipitate the respective salt. Dilution with acetone of the original reaction mixture followed by addition of HI, precipitates the hydriodide salt.

The hydriodide salt, on elemental analysis, shows the following values:

Calc. for $C_{22}H_{21}N_2O_8Cl \cdot HI$: C, 43.7; H, 3.7; N, 4.6; Cl, 5.8. Found: C, 44.0; H, 4.0; N, 4.2; Cl, 5.5.

Ultraviolet analysis shows the following maxima: 222, 270 and 372 m$\mu$. Infrared analysis shows principal peaks at 3.05, 3.2, 5.7, 6.02, 6.03, 6.22, 6.4, 6.88, 7.4, 7.8, 8.1, 8.9 and 9.1 microns. The perchlorate salt on ultraviolet analysis shows maxima at 237, 270 and 372 m$\mu$.

EXAMPLE XXX

*6-Deoxy-6-Demethyl-6-Methylene-5-Oxytetracycline*

To a solution of 5 g. of the Example XXIX product (as the hydriodide) in 125 ml. of dilute hydrochloric acid (1 part conc. HCl in 55 parts of water) at 20° C. is added 2 g. of zinc dust. After stirring for 10 minutes, the zinc is filtered off, the filtrate adjusted to pH 0.8 and extracted with butanol. The butanol extract is concentrated under reduced pressure to a residue which is triturated with ether. The ether-insoluble residue is crystallized from methanol-acetone-conc. HCl-ether to obtain the product as the hydrochloride-monomethanolate (2.5 g.) melting at 205° C. with decomposition. Ultraviolet analysis in 0.01 N HCl in methanol shows $\lambda_{max}$ 252 m$\mu$, $E_{1\,cm.}^{1\%}$, 450 and $\lambda_{max}$ 345 m$\mu$, $E_{1\,cm.}^{1\%}$, 302; in 0.01 N NaOH in methanol, $\lambda_{max}$ 235 m$\mu$, $E_{1\,cm.}^{1\%}$, 442; $\lambda_{max}$ 254 m$\mu$, $E_{1\,cm.}^{1\%}$, 408; $\lambda_{max}$ 385 m$\mu$, $E_{1\,cm.}^{1\%}$, 329; $\lambda_{inf}$ 280 m$\mu$, $E_{1\,cm.}^{1\%}$, 329; in 0.01 N MgCl$_2$ in methanol, $\lambda_{max}$ 240 m$\mu$, $E_{1\,cm.}^{1\%}$, 461 $\lambda_{max}$ 277 m$\mu$, $E_{1\,cm.}^{1\%}$, 326 $\lambda_{max}$ 351 m$\mu$, $E_{1\,cm.}^{1\%}$, 282

Infrared analysis shows principal peaks at 6.03, 6.2, 6.37 and 6.87 microns. Elemental analysis of the product gives the following values: C, 55.0; H, 5.2; N, 5.5; Cl, 7.0; OCH$_3$, 3.4. The product shows Rf values of 0 and 0.35 respectively in the following systems:

| Mobile Phase | Immobile Phase |
|---|---|
| (1) 20:3 toluene-pyridine saturated with pH 4.2 buffer. | pH 4.2 buffer (aqueous). |
| (2) 20:10:3 nitromethane, chloroform pyridine saturated with pH 3.5 buffer. | pH 3.5 buffer (aqueous). |

EXAMPLE XXXI

*11a-Chlorotetracycline-6,12-Hemiketal*

This compound is prepared in accordance with the method of Example XXVIII by substituting an equivalent amount of tetracycline for the oxytetracycline of Example XXVIII.

EXAMPLE XXXII

*11a-Chloro-6-Deoxy-6-Demethyl-6-Methylenetetracycline*

11a-chlorotetracycline-6,12-hemiketal is dissolved in liquid hydrogen fluoride (in a ratio of 2 g./15 ml.) at 0° C. The mixture is maintained at this temperature for 10–15 minutes, after which the hydrogen fluoride is evaporated off. The residue is triturated in ether to obtain the solid product, 11a-chloro-6-deoxy-6-demethyl-6-methylenetetracycline, as the hydrofluoride salt which is recrystallized from methanol.

Alternatively, the crude hydrofluoride product (10 g.) is dissolved in 350 ml. of H$_2$O by warming and stirring. An equal volume of conc. HCl is added to the clear solution and the product crystallizes as the hydrochloride salt. Elemental analysis of the hydrochloride salt thus obtained gives the following results:

Calcd. for $C_{22}H_{22}O_7N_2Cl_2$: C, 53.11; H, 4.56; chloride 7.13; N, 5.63. Found: C, 52.62; H, 4.63; chloride 6.84; N, 5.54.

Infrared analysis of the product as the hydrochloride salt in a KBr pellet at 1% concentration shows carbonyl absorption at 5.70 as well as the following significant peaks: 6.1, 6.23, 6.36, 6.45 (shoulder) 6.91, 6.85, 8.14, 8.55, 10.22, 10.55 and 10.89. Ultraviolet analysis of the sample in 0.01 N methanol-HCl shows maxima at 376, 278 and 242 m$\mu$. The product shows an Rf value of from 0.2 to 0.3 in the following system:

| Mobile Phase | Immobile Phase |
|---|---|
| 20:3 toluene-pyridine saturated with pH 4.2 buffer. | pH 4.2 buffer (aqueous). |

On analysis of the papergram with ultraviolet light, the product spot does not fluoresce strongly. However, on spraying, with aqueous sodium hydrosulfite, it shows strong fluorescence.

The C.4 epimer of the product, present as a minor impurity, shows Rf 0.1 in this system.

EXAMPLE XXXIII

*6-Deoxy-6-Demethyl-6-Methylenetetracycline*

The product of Example XXXII (5 mg.) is dissolved in 3 ml. of methanol and a freshly prepared solution of sodium hydrosulfite (20 mg. in 2 ml. of water) is added. The mixture is allowed to stand for 15 minutes at room temperature, after which it is stripped of methanol and extracted with butanol. The butanol extract is concentrated to obtain the product, 6-deoxy-6-demethyl-6-methylenetetracycline. The product is crystallized from water as the p-toluene-sulfonate salt by addition of p-toluenesulfonic acid. Alternatively, it is crystallized as the hydrochloride salt from water by addition of concentrated HCl.

The product shows an Rf value of 0.6 in the same system as described in Example XXXII, and shows Rf 0.9 in the following system:

| Mobile Phase | Immobile Phase |
|---|---|
| 20:10:3 nitromethane:chloroform:pyridine. | pH 3.5 buffer (aqueous). |

The C.4 epimer of this substance show Rf's of approximately 0.4 and approximately 0.6 in the two systems.

Method B: A solution of 50 g. of 11a-chloro-6-deoxy-6-demethyl-6-methylene-tetracycline hydrochloride in 500 ml. of monomethyl ether of ethylene glycol is cooled to 4° C. in an ice bath and the rapidly stirred solution is treated with 50 g. of zinc metal dust at a gradual rate over a period of about 10 minutes. The temperature rises to 12° C. during addition. After addition is complete, the temperature begins to fall. After a total reaction time of 15 minutes the zinc is removed by rapid filtration and washed with solvent. One liter of water is added gradually to the filtrate over a period of about 10 minutes. A yellow slurry of the zinc complex of the product is formed. The pH of the solution is then adjusted to 6.8 with 10% aqueous sodium hydroxide.

The resulting slurry is digested for about 1.5 hours in an ice bath and filtered. The wet cake is then slurried in 750 ml. of water and conc. HCl is added dropwise until a clear solution is obtained. A slight excess of conc. HCl causes rapid crystallization of 6-deoxy-6-demethyl-6-methylenetetracycline hydrochloride as glistening needles. After digestion for one hour, the product is filtered and dried. The yield of product is 37.8 g. The product melts at 213.8–214.2° C. with decomposition.

EXAMPLE XXXIV

*Acid Addition Salts of 6-Deoxy-13-(β-Hydroxyethylmercapto)Tetracycline*

6-deoxy-13-(β-hydroxyethylmercapto)tetracycline is dissolved in methanol containing an equimolar amount of hydrogen chloride. The hydrochloride salt is then precipitated by the addition of ether, and is collected by filtration and dried.

In a similar manner, acid addition salts of 6-deoxy-13-(β-hydroxyethylmercapto)tetracycline are prepared using, in lieu of hydrochloric acid sulfuric, nitric, perchloric, hydrobromic, phosphoric, hydrofluoric, p-toluenesulfonic, hydriodic, tartaric, acetic, citric, malic, benzoic, glycollic, gluconic, gulonic, succinic, and sulfosalicyclic acids.

In like manner, the acid addition salts of the products of the examples appearing hereinbefore are prepared. Those acid addition salts which are pharmaceutically unacceptable may be employed in conventional fashion for purification purposes to produce either the amphoteric compounds or pharmaceutically acceptable acid addition salts thereof. Additionally, the pharmaceutically unacceptable acid addition salts are useful as intermediates for producing other products of the present invention.

EXAMPLE XXXV

*Metal Salts of 6-Deoxy-13-(β-Hydroxyethylmercapto)Tetracycline*

The sodium salt of 6-deoxy-13-(β-hydroxyethylmercapto)tetracycline is prepared by dissolving the amphoteric compound in methanol containing an equimolar amount of sodium hydroxide and evaporating the resulting mixture in vacuo. In this fashion, other metal salts are prepared including potassium, calcium, barium, lithium and strontium salts.

Metal salts complexes of 6-deoxy-13-(β-hydroxyethylmercapto)tetracycline are prepared by dissolving it in a lower aliphatic alcohol, preferably methanol, and treating with an equimolar amount of the selected metal salt, preferably dissolved in the selected alcohol. The insoluble metal salt complexes may be insulated by simple filtration. Generally, however, most of them are alcohol soluble and recovery is effected by evaporation of the solvent or addition of a non-solvent such as diethyl ether.

In this fashion, metal salt complexes of 6-deoxy-13-(β-hydroxyethylmercapto)tetracycline consisting primarily of compounds containing 1:1 ratio of metal to 6-deoxy-13-(β-hydroxyethylmercapto)tetracycline are prepared employing the following metal salts: calcium chloride, cobalt chloride, magnesium sulfate, magnesium chloride, stannous chloride, zinc chloride, cadmium chloride, barium chloride, silver nitrate, stannous nitrate, strontium nitrate, magnesium acetate, manganous acetate, palladium chloride, manganous chloride, cerium chloride, titanium chloride, platinum chloride, vanadium chloride, plumbous acetate, stannous bromide, zinc sulfate, chromous chloride and nickelous chloride.

In the same fashion, the same metal salt complexes of the compounds of the examples appearing hereinbefore are prepared.

EXAMPLE XXXVI

| | G. |
|---|---|
| 6-deoxy-13-(β-hydroxyethylmercapto)tetracycline | 1 |
| Liquid petrolatum | 6.5 |
| White petrolatum | 92.5 |

The two vehicles are combined and the antibiotic is carefully blended in about 10% of the combination. The remainder of the vehicle is gradually introduced, with thorough blending after each addition, to provide a preparation suitable for topical use.

The remaining new products of the preceding examples are formulated in the same fashion.

What is claimed is:

1. A compound selected from the group consisting of those having the formula

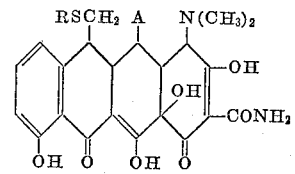

wherein A is selected from the group consisting of hydrogen and hydroxy and R is selected from the group consisting of primary and secondary alkyl of from one to twelve carbon atoms; R"CO where R" is alkyl of from one to three carbon atoms; phenyl; mono- and disubstituted phenyl; benzoyl; trifluoromethyl and R'CH$_2$—
   wherein R' is selected from the group consisting of mono- and disubstituted lower alkyl, carboxy, lower carbalkoxy, halo, phenyl, mono- and disubstituted phenyl and furyl,
   each substituent of said mono- and disubstituted lower alkyl being selected from the group consisting of hydroxy, lower alkoxy, carboxy, lower carbalkoxy, halo and amino, provided that where two of said substituents are joined to the same carbon atom at least one is selected from the group consisting of carboxy and lower carbalkoxy,
   and each substituent of said mono- and disubstituted phenyl being selected from the group consisting of lower alkyl, hydroxy, lower alkoxy, carboxy, lower carbalkoxy, nitro and amino,
   the acid addition salts thereof, and the pharmaceutically acceptable metal salts thereof.

2. 6-deoxy-13-(β-hydroxyethylmercapto)tetracycline.
3. 6-deoxy-13-(acetylmercapto)-5-oxytetracycline.
4. A compound selected from the group consisting of 6-deoxy-13-mercaptotetracycline, 6-deoxy-13-mercapto-5-oxytetracycline, the acid addition salts thereof and the pharmaceutically acceptable metal salts thereof.
5. 6-deoxy-13-mercaptotetracycline.
6. 6-deoxy-13-mercapto-5-oxytetracycline.
7. A compound selected from the group consisting of those having the formula

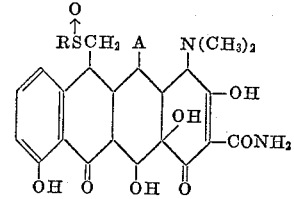

wherein A is selected from the group consisting of hydrogen and hydroxy and R is selected from the group consisting of primary and secondary alkyl of from one to twelve carbon atoms; R"CO where R" is alkyl of from one to three carbon atoms; phenyl; mono- and disubstituted phenyl; benzoyl; trifluoromethyl and R'CH$_2$—
   wherein R' is selected from the group consisting of mono- and disubstituted lower alkyl, carboxy, lower carbalkoxy, halo, phenyl, mono- and disubstituted phenyl and furyl, each substituent of said mono- and disubstituted lower alkyl being selected from the group consisting of hydroxy, lower alkoxy, carboxy, lower carbalkoxy, halo and amino, provided that where two of said substituents are joined to the same carbon atom at least one is selected from the group consisting of carboxy and lower carbalkoxy, and each substituent of said mono- and disubstituted phenyl being selected from the group consisting of lower alkyl, hydroxy, lower alkoxy, carboxy, lower carbalkoxy, nitro and amino, the acid addition salts thereof, and the pharmaceutically acceptable metal salts thereof.

8. 6-deoxy-13-(β-hydroxyethylmercapto)tetracycline sulfoxide.

9. 6-deoxy-13-(phenylmercapto)tetracycline sulfoxide.

10. 6-deoxy-13-(benzylmercapto)tetracycline sulfoxide.

11. A compound selected from the group consisting of 7,13-epithio-6-deoxytetracycline, 11a,13-epithio-6-deoxytetracycline, the acid addition salts thereof and the pharmaceutically acceptable metal salts thereof.

12. 7,13-epithio-6-deoxytetracycline.

13. 11a,13-epithio-6-deoxytetracycline.

14. The process of producing a compound selected from the group consisting of 6-epi-6-deoxytetracycline and 6-epi-6-deoxy-5-oxytetracycline which comprises the step of contacting a 13-substituted-6-deoxytetracycline in a reaction-inert solvent with at least an equal weight of Raney nickel at a temperature of from 20 to 130° C., said substituted tetracycline being selected from the group consisting of 6-deoxy-13-mercaptotetracycline, 6-deoxy-13-mercapto-5-oxytetracycline, 7,13-epithio-6-deoxytetracycline, 11a,13-epithio-6-deoxytetracycline; and tetracyclines of the formula

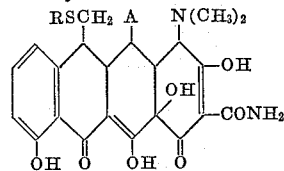

wherein A is selected from the group consisting of hydrogen and hydroxy and R is selected from the group consisting of primary and secondary alkyl of from one to twelve carbon atoms; R"CO where R" is alkyl of from one to three carbon atoms; phenyl; mono- and disubstituted phenyl; benzoyl; trifluoromethyl and R'CH$_2$— where R' is selected from the group consisting of mono- and disubstituted lower alkyl, carboxy, lower carbalkoxy, halo, phenyl, mono- and disubstituted phenyl and furyl, each substituent of said mono- and disubstituted lower alkyl being selected from the group consisting of hydroxy, lower alkoxy, carboxy, lower carbalkoxy, halo and amino, provided that where two of said substituents are joined to the same carbon atom at least one is selected from the group consisting of carboxy and lower carbalkoxy, and each substituent of said mono- and disubstituted phenyl being selected from the group consisting of lower alkyl, hydroxy, lower alkoxy, carboxy, lower carbalkoxy, nitro and amino, and the corresponding sulfoxides thereof.

No references cited.

IRVING MARCUS, *Primary Examiner*.
NICHOLAS S. RIZZO, *Examiner*.